(12) United States Patent
Austin, III et al.

(10) Patent No.: US 11,439,255 B2
(45) Date of Patent: Sep. 13, 2022

(54) SHOWER DOOR ASSEMBLY DISPLAY AND RETAIL

(71) Applicant: LIBERTY HARDWARE MFG. CORP., Winston-Salem, NC (US)

(72) Inventors: James Allen Austin, III, Highpoint, NC (US); Patrick William Boehnen, Summerfield, NC (US); Matthew James Klein, Apex, NC (US); Richard L. Roetken, Avon, IN (US); Marcus Bosch, Chicago, IL (US); Geraint Krumpe, Chicago, IL (US); Natalie A. Schraufnagel, Chicago, IL (US)

(73) Assignee: LIBERTY HARDWARE MFG CORP., Winston-Salem, NC (US)

( * ) Notice: Subject to any disclaimer, the term of this patent is extended or adjusted under 35 U.S.C. 154(b) by 149 days.

(21) Appl. No.: 16/363,629

(22) Filed: Mar. 25, 2019

(65) Prior Publication Data

US 2019/0216237 A1     Jul. 18, 2019

Related U.S. Application Data

(62) Division of application No. 13/483,487, filed on May 30, 2012, now abandoned.

(51) Int. Cl.
*G06Q 30/06*     (2012.01)
*A47F 7/00*      (2006.01)
(Continued)

(52) U.S. Cl.
CPC ............. *A47F 7/0042* (2013.01); *A47F 7/30* (2013.01); *G06Q 30/0281* (2013.01); *G06Q 30/06* (2013.01); *G06Q 30/0621* (2013.01)

(58) Field of Classification Search
CPC ..... G06Q 30/06; G06Q 30/0601–0643; G06Q 30/08; G06Q 30/0621; G06Q 30/0281; G06T 2210/04; A47F 7/0042
See application file for complete search history.

(56) References Cited

U.S. PATENT DOCUMENTS 475,948 A     5/1892  Pease
739,027 A     9/1903  Raum
(Continued)

FOREIGN PATENT DOCUMENTS

CA     2505163 A1     10/2006
CN     203175303 U     9/2013
(Continued)

OTHER PUBLICATIONS www.ThermaTru.com. Recovered from www.Archive.org. Dated: Oct. 4, 2011 to Oct. 14, 2011. (Year: 2011).*
(Continued)

*Primary Examiner* — William J Allen
(74) *Attorney, Agent, or Firm* — Brooks Kushman P.C.; Lora Graentzdoerffer (57) ABSTRACT

A retail shower door display assembly is provided with a point-of-sale display unit sized to be received within a retail store aisle. An array of various shower door frames is oriented within the display unit. An array of various shower door glass panes is oriented within the display unit. A method for displaying shower door assemblies for retail is provided by displaying various shower door frames for purchaser selection. Various shower door glass panes are provided for purchaser selection independent of the shower door frames.

11 Claims, 7 Drawing Sheets

(51) Int. Cl.
    *A47F 7/30*     (2006.01)
    *G06Q 30/02*     (2012.01)

(56) References Cited

U.S. PATENT DOCUMENTS

| | | |
|---|---|---|
| 805,570 A | 11/1905 | Maldaner |
| 865,465 A | 9/1907 | Williams |
| 949,915 A | 2/1910 | Schreiber |
| 1,242,872 A | 10/1917 | Saunders |
| 1,530,211 A | 3/1925 | Siemnash |
| 1,688,255 A | 10/1928 | Wasch |
| 1,714,692 A | 5/1929 | Pagel et al. |
| 1,736,828 A | 11/1929 | Lobban |
| 1,841,620 A | 1/1932 | McCoy |
| 1,927,837 A | 9/1933 | Kingdon |
| 2,113,288 A | 4/1938 | Berger |
| 2,223,770 A | 12/1940 | Nagle |
| D129,731 S | 9/1941 | Luttrell |
| 2,290,104 A | 7/1942 | Larson |
| 2,501,609 A | 3/1950 | Midouhas |
| D165,358 S | 12/1951 | Baldwin |
| D174,553 S | 4/1955 | Harris |
| 2,879,899 A | 3/1959 | Shenkin |
| 2,884,136 A | 4/1959 | Leighton |
| 2,887,219 A | 5/1959 | Lester, Jr. |
| 2,937,743 A | 5/1960 | Buttery et al. |
| 2,944,679 A | 7/1960 | Rubenstein |
| 2,950,001 A | 8/1960 | Bucko |
| 3,033,356 A | 5/1962 | Meyerson |
| 3,095,970 A | 7/1963 | Gaulke |
| 3,108,657 A | 10/1963 | Carlson |
| 3,121,511 A | 2/1964 | Whitehead |
| 3,175,694 A | 3/1965 | Reibold et al. |
| D202,485 S | 10/1965 | Fletcher et al. |
| 3,233,753 A | 2/1966 | Rich |
| 3,347,357 A | 10/1967 | Soto et al. |
| 3,359,573 A | 12/1967 | Casebolt |
| 3,361,330 A | 1/1968 | Arneson |
| 3,385,451 A | 5/1968 | Anderson |
| D211,321 S | 6/1968 | Ullmann |
| 3,388,787 A | 6/1968 | Growney |
| 3,403,777 A | 10/1968 | Bucko |
| 3,468,593 A | 9/1969 | Catlett |
| 3,517,459 A | 6/1970 | Schupper |
| 3,517,801 A | 6/1970 | Cote |
| D224,692 S | 8/1972 | Gray |
| 3,732,633 A | 5/1973 | Margolis et al. |
| D227,351 S | 6/1973 | Winton |
| 3,777,883 A | 12/1973 | Hackenberg |
| 3,777,896 A | 12/1973 | Ehrlich |
| 3,889,813 A | 6/1975 | Wright |
| 3,935,949 A | 2/1976 | Cohen |
| D240,503 S | 7/1976 | Crescenzi et al. |
| 4,105,125 A | 8/1978 | Magness |
| 4,109,786 A | 8/1978 | Roccaforte et al. |
| 4,145,849 A | 3/1979 | Shindoll et al. |
| 4,241,832 A | 12/1980 | Bliss |
| 4,256,043 A | 3/1981 | Ovitz, III |
| D259,161 S | 5/1981 | Fhauer |
| 4,315,569 A | 2/1982 | Jaeschke |
| 4,342,268 A | 8/1982 | Grava |
| 4,378,905 A | 4/1983 | Roccaforte |
| 4,385,687 A | 5/1983 | Dutcher |
| 4,429,791 A | 2/1984 | Ruppel et al. |
| 4,634,010 A | 1/1987 | Otema |
| 4,705,175 A | 11/1987 | Howard et al. |
| 4,720,876 A | 1/1988 | Tomei et al. |
| 4,750,609 A | 6/1988 | Felis |
| 4,762,235 A | 8/1988 | Howard et al. |
| 5,031,781 A | 7/1991 | Price et al. |
| D319,934 S | 9/1991 | Terrell et al. |
| D323,986 S | 2/1992 | Ferrero |
| 5,111,943 A | 5/1992 | Ramey |
| 5,152,689 A | 10/1992 | Kurzman |
| D332,744 S | 1/1993 | McCooey |
| 5,234,113 A | 8/1993 | Ramey |
| D343,075 S | 1/1994 | Cappel, III |
| 5,297,685 A | 3/1994 | Ramey |
| 5,305,898 A | 4/1994 | Merl |
| D349,458 S | 8/1994 | Verdaguer |
| 5,346,076 A | 9/1994 | Hart |
| 5,348,167 A | 9/1994 | Jensen |
| 5,368,486 A | 11/1994 | Kurzman |
| 5,372,278 A | 12/1994 | Leight |
| D355,586 S | 2/1995 | Wang |
| 5,467,915 A | 11/1995 | Mattson |
| 5,503,278 A | 4/1996 | Ishmael |
| 5,509,541 A | 4/1996 | Merl |
| D372,816 S | 8/1996 | Rose et al. |
| 5,547,053 A | 8/1996 | Liang |
| D377,144 S | 1/1997 | Sawa |
| D383,335 S | 9/1997 | Shanahan et al. |
| 5,675,936 A | 10/1997 | Kurth et al. |
| D392,820 S | 3/1998 | Shanahan et al. |
| 5,769,247 A | 6/1998 | Meri |
| D396,805 S | 8/1998 | Broyles |
| 5,822,810 A | 10/1998 | Chen |
| 5,823,339 A | 10/1998 | Dunham et al. |
| 5,848,446 A | 12/1998 | DeBraal |
| 5,860,526 A | 1/1999 | Burke, Jr. |
| D405,369 S | 2/1999 | Dohner |
| 5,887,782 A | 3/1999 | Mueller |
| D409,858 S | 5/1999 | Reed |
| 5,941,384 A | 8/1999 | Schonhardt et al. |
| D417,978 S | 12/1999 | Reed |
| D425,972 S | 5/2000 | Smale |
| 6,102,206 A | 8/2000 | Pride |
| 6,102,502 A | 8/2000 | Melillo et al. |
| 6,105,796 A | 8/2000 | Buchanan et al. |
| 6,170,675 B1 | 1/2001 | Follman et al. |
| 6,182,738 B1 | 2/2001 | Chen |
| 6,250,044 B1 | 6/2001 | Funk et al. |
| D451,305 S | 12/2001 | Chang et al. |
| D451,801 S | 12/2001 | Schillinger |
| 6,340,092 B1 | 1/2002 | McGrath, Jr. |
| D454,067 S | 3/2002 | Schoening et al. |
| 6,389,991 B1 | 5/2002 | Morrisson |
| D461,974 S | 8/2002 | Hayden |
| 6,461,705 B2 | 10/2002 | Eichhorn |
| 6,467,856 B1 | 10/2002 | Chang et al. |
| 6,484,890 B1 | 11/2002 | Miller |
| D466,804 S | 12/2002 | Solland |
| D469,349 S | 1/2003 | Meeker et al. |
| 6,594,973 B1 | 7/2003 | Alpert et al. |
| D482,265 S | 11/2003 | Wicha |
| 6,672,546 B2 | 1/2004 | Calleja |
| 6,681,445 B2 | 1/2004 | Huang |
| 6,701,672 B2 | 3/2004 | Feubert et al. |
| 6,811,046 B2 | 11/2004 | Stein |
| 6,850,208 B1 | 2/2005 | Ferrante |
| 6,895,714 B2 | 5/2005 | Teubert et al. |
| D507,741 S | 7/2005 | Lu et al. |
| 6,913,151 B2 | 7/2005 | Stevenson |
| 6,935,514 B2 | 8/2005 | Lackey et al. |
| 7,137,172 B2 | 11/2006 | Elmer |
| 7,150,361 B2 | 12/2006 | Calleja |
| 7,178,681 B2 | 2/2007 | Libman |
| 7,264,126 B1 | 9/2007 | Bergeron |
| 7,273,084 B2 | 9/2007 | Chen |
| 7,334,381 B2 | 2/2008 | Mertz, II et al. |
| 7,346,939 B2 | 3/2008 | Perry |
| D579,407 S | 10/2008 | Creech et al. |
| D584,528 S | 1/2009 | Neff et al. |
| D588,905 S | 3/2009 | Meeks et al. |
| D593,409 S | 6/2009 | Blick |
| D594,742 S | 6/2009 | Meier et al. |
| 7,562,949 B1 | 7/2009 | Nielsen |
| D600,110 S | 9/2009 | Cain |
| 7,637,059 B2 | 12/2009 | Chang et al. |
| D607,724 S | 1/2010 | Dreier et al. |
| 7,748,527 B2 | 7/2010 | Wisecarver et al. |
| 7,762,508 B2 | 7/2010 | Xu |
| D622,083 S | 8/2010 | Linder |
| 7,828,151 B2 | 11/2010 | Murdoch et al. |

(56) References Cited

U.S. PATENT DOCUMENTS

| | | |
|---|---|---|
| 7,841,048 B2 | 11/2010 | Tsai |
| 7,900,784 B1 | 3/2011 | Weigand et al. |
| D639,652 S | 6/2011 | Abdalkhani et al. |
| 7,962,998 B2 | 6/2011 | Proctor et al. |
| D652,717 S | 1/2012 | Shimoyama et al. |
| 8,151,385 B2 | 4/2012 | Goskowski et al. |
| D660,988 S | 5/2012 | Amend |
| 8,191,707 B2 | 6/2012 | McDonald et al. |
| D668,540 S | 10/2012 | Lutzig |
| 8,312,998 B2 | 11/2012 | Theisen |
| D685,260 S | 7/2013 | Thielemier |
| 8,490,331 B2 | 7/2013 | Quesada |
| D689,360 S | 9/2013 | Adams |
| D690,592 S | 10/2013 | Ding |
| D690,593 S | 10/2013 | Kaps et al. |
| D694,099 S | 11/2013 | Ensslen, III et al. |
| D699,563 S | 2/2014 | McAdam |
| 8,707,475 B2 | 4/2014 | Johnson et al. |
| D706,626 S | 6/2014 | Lazar |
| D709,363 S | 7/2014 | Boehnen et al. |
| 8,789,899 B2 | 7/2014 | Pirro et al. |
| D710,713 S | 8/2014 | Fath |
| 8,915,381 B2 | 12/2014 | Brozak et al. |
| D729,055 S | 5/2015 | Lemnios et al. |
| 9,108,775 B2 | 8/2015 | Savakus |
| D739,726 S | 9/2015 | Lemnios et al. |
| D758,771 S | 6/2016 | Austin, III et al. |
| D763,023 S | 8/2016 | Austin, III et al. |
| D767,380 S | 9/2016 | Austin, III et al. |
| 9,434,524 B2 | 9/2016 | Kindig |
| D777,018 S | 1/2017 | Boehnen et al. |
| D777,564 S | 1/2017 | Boehnen et al. |
| 9,676,543 B2 | 6/2017 | Lemnios et al. |
| D791,519 S | 7/2017 | Jordan et al. |
| 10,070,739 B2 | 9/2018 | Austin, III et al. |
| 2001/0002660 A1 | 6/2001 | Riga et al. |
| 2001/0054258 A1 | 12/2001 | Becken |
| 2002/0134030 A1 | 9/2002 | Conway |
| 2002/0144375 A1 | 10/2002 | Drucker et al. |
| 2002/0157318 A1 | 10/2002 | Teubert et al. |
| 2003/0019982 A1 | 1/2003 | Wing et al. |
| 2003/0047528 A1 | 3/2003 | Stein |
| 2004/0159049 A1 | 8/2004 | Teubert et al. |
| 2004/0177437 A1 | 9/2004 | Perry |
| 2004/0238465 A1 | 12/2004 | Mercure |
| 2004/0245195 A1 | 12/2004 | Pride |
| 2005/0006332 A1 | 1/2005 | Stein |
| 2005/0115202 A1 | 6/2005 | Mertz, II et al. |
| 2005/0115860 A1 | 6/2005 | Mertz, II et al. |
| 2005/0236299 A1 | 10/2005 | Weber et al. |
| 2005/0289022 A1* | 12/2005 | Iida .................. G06Q 10/087 705/29 |
| 2006/0043032 A1 | 3/2006 | McHugh |
| 2006/0196838 A1 | 9/2006 | Mercure et al. |
| 2006/0208150 A1 | 9/2006 | Elmer et al. |
| 2007/0045204 A1 | 3/2007 | Huard et al. |
| 2007/0295680 A1 | 12/2007 | Budge |
| 2008/0073469 A1 | 3/2008 | Mushan et al. |
| 2008/0148639 A1 | 6/2008 | Jakob-Bamberg et al. |
| 2008/0148692 A1 | 6/2008 | Wisecarver et al. |
| 2008/0277363 A1 | 11/2008 | McDonough |
| 2009/0115299 A1 | 5/2009 | Ricereto |
| 2010/0107497 A1 | 5/2010 | Hulst et al. |
| 2010/0181267 A1 | 7/2010 | Theisen |
| 2010/0264058 A1 | 10/2010 | Krause |
| 2011/0035871 A1 | 2/2011 | Seymour et al. |
| 2011/0113547 A1 | 5/2011 | O'Connell |
| 2012/0005822 A1 | 1/2012 | Daubmann et al. |
| 2012/0036628 A1 | 2/2012 | O'Connell |
| 2012/0054075 A1* | 3/2012 | Ostroff ............... G06Q 30/0643 705/27.2 |
| 2012/0233926 A1 | 9/2012 | Chang et al. |
| 2012/0259743 A1 | 10/2012 | Pate, Jr. |
| 2013/0093298 A1 | 4/2013 | Ehmke et al. |
| 2013/0140319 A1 | 6/2013 | Tam et al. |
| 2013/0161276 A1 | 6/2013 | Breeden et al. |
| 2014/0032447 A1 | 1/2014 | Fisher |
| 2014/0173990 A1 | 6/2014 | Schachter et al. |
| 2014/0237715 A1 | 8/2014 | Wei |
| 2014/0250795 A1 | 9/2014 | Wei |
| 2014/0259363 A1 | 9/2014 | Ball et al. |
| 2014/0290001 A1 | 10/2014 | Hasegawa |
| 2014/0319988 A1 | 10/2014 | Dietz et al. |
| 2014/0331564 A1 | 11/2014 | Wei |
| 2015/0208875 A1 | 7/2015 | Austin, III et al. |
| 2015/0210113 A1 | 7/2015 | Yang |

FOREIGN PATENT DOCUMENTS

| | | |
|---|---|---|
| CN | 204326804 U | 5/2015 |
| CN | 204370961 U | 6/2015 |
| DE | 2149016 | 4/1973 |
| DE | 9306878 U1 | 9/1993 |
| DE | 202009004111 U1 | 8/2009 |
| EP | 1020154 A2 | 7/2000 |
| EP | 2317052 A2 | 5/2011 |
| EP | 2774519 A1 | 9/2014 |
| GB | 827312 | 2/1960 |
| JP | 2001095657 A | 4/2001 |
| JP | 2003237846 A | 8/2003 |
| WO | 2005035396 A2 | 4/2005 |
| WO | 2005035396 A3 | 4/2005 |
| WO | 2008076224 A1 | 6/2008 |
| WO | 2008133531 A1 | 11/2008 |
| WO | 2009029358 A1 | 3/2009 |

OTHER PUBLICATIONS www.BascoShowerDoor.com. Recovered from www.Archive.org. Dated: Apr. 11, 2011 to May 28, 2011. (Year: 2011).* www.thermatru.com/trade-professional/dppgallerdisplays.aspx (Jul. 10, 2010) [recovered from www.Archive.org] (Year: 2010).*

HouseImprovements, Video: "How to Install Glass Sliding Shower Doors," Oct. 4, 2012, https://www.youtube.com/watch?v=u88j284_jAk, 32:25.

www.thermatru.com/trade-professional/dpprgallerdisplays.aspx, Jul. 10, 2010, 31 pages.

http://www.johnsonhardware.com/doordisplay.htm, "Johnson Hardware Door Panel Display Unit", Dec. 16, 2010, 2 pages.

Quality Craft, "Installation Manual Shower Unit", Model No. 961WUX006WHI, Mar. 9, 2011, 14 pages.

Mexican Office Action for Application No. MX/a/2013/006006, dated May 6, 2015, 4 pages.

Mexican Office Action for Application No. MX/a/2013/006006, dated Mar. 29, 2016, 2 pages.

Mexican Office Action for Application No. MX/a/2013/006006, dated Oct. 22, 2015, 3 pages.

English translation of Mexican Office Action for Application No. MX/a/2013/006006, dated May 6, 2015, 4 pages.

English translation of Mexican Office Action for Application No. MX/a/2013/006006, dated Mar. 29, 2016, 2 pages.

Canadian Office Action for Application No. 2,816,779, dated Dec. 2, 2019, 3 pages.

Canadian Office Action for Application No. 2,816,779, dated Dec. 9, 2020, 3 pages.

Canadian Office Action for Application No. 2,816,779, dated Jul. 6, 2021, 4 pages.

* cited by examiner

SHOWER DOOR ASSEMBLY DISPLAY AND RETAIL

CROSS-REFERENCE TO RELATED APPLICATIONS

This application is a division of U.S. application Ser. No. 13/483,487 filed May 30, 2012, the disclosure of which is hereby incorporated in its entirety by reference herein.

TECHNICAL FIELD

Various embodiments relate to shower door assemblies; and retail displays and methods for displaying shower door assemblies.

BACKGROUND

The prior art has provided shower door assemblies that are assembled and packaged for retail.

SUMMARY

A retail shower door display assembly according to at least one embodiment is provided with a point-of-sale display unit sized to be received within a retail store aisle. An array of various shower door frames is oriented within the display unit. An array of various shower door glass panes is oriented within the display unit.

A retail shower door display system according to another embodiment is provided with a first retail shower door display assembly and a second retail shower door assembly. Each of the frames and glass panes of the first retail shower door display assembly are sized for a first shower door size. Each of the frames and glass panes of the second retail shower door display assembly are sized for a second shower door size that is different from the first shower door size.

A retail shower door display system according to another embodiment is provided with a first retail shower door display assembly and a second retail shower door assembly. Each of the frames and glass panes of the first retail shower door display assembly are sized for a first shower door style. Each of the frames and glass panes of the second retail shower door display assembly are sized for a second shower door style that is different from the first shower door style.

A method for displaying shower door assemblies for retail is provided according to an embodiment. Various shower door frames are displayed for purchaser selection. Various shower door glass panes are provided for purchaser selection independent of the shower door frames.

A retail system for shower door assemblies is provided with a controller configured to display various shower door frames for purchaser selection. The controller displays various shower door glass panes for purchaser selection independent of the shower door frames. The controller receives input indicative of a consumer selection of a shower door frame. The controller receives input indicative of a consumer selection of a shower door glass pane. The controller selects a shower door assembly based on the selected shower door frame, and the selected shower door glass pane.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventional shower door assemblies are retailed preassembled. Conventional shower door assemblies typically include shower door frames, shower door glass panes, and shower hardware assemblies. The preassembled retail of these assemblies limits consumer options, while providing an overall unit that is relatively large and consequently difficult to transport from the point-of-sale to the point of installation. The preassembled unit may also be difficult to install.

Pre-assembling conventional shower door assemblies requires manufacturing of the distinct components; and subsequent assembly. Due to the varying materials of frames, glass panes, and hardware, the shower door assembly components may be manufactured at different manufacturing facilities. Pre-assembling may require shipping of the components to a common facility; assembling the components; and subsequent shipping to the point-of-sale retailer.

Manufacturing of preassembled shower door assemblies may involve difficulties in predicting consumer demand for various combinations of components. Likewise, availability of replacement components may be limited due to an unpredictability of the demand.

Figure 1:
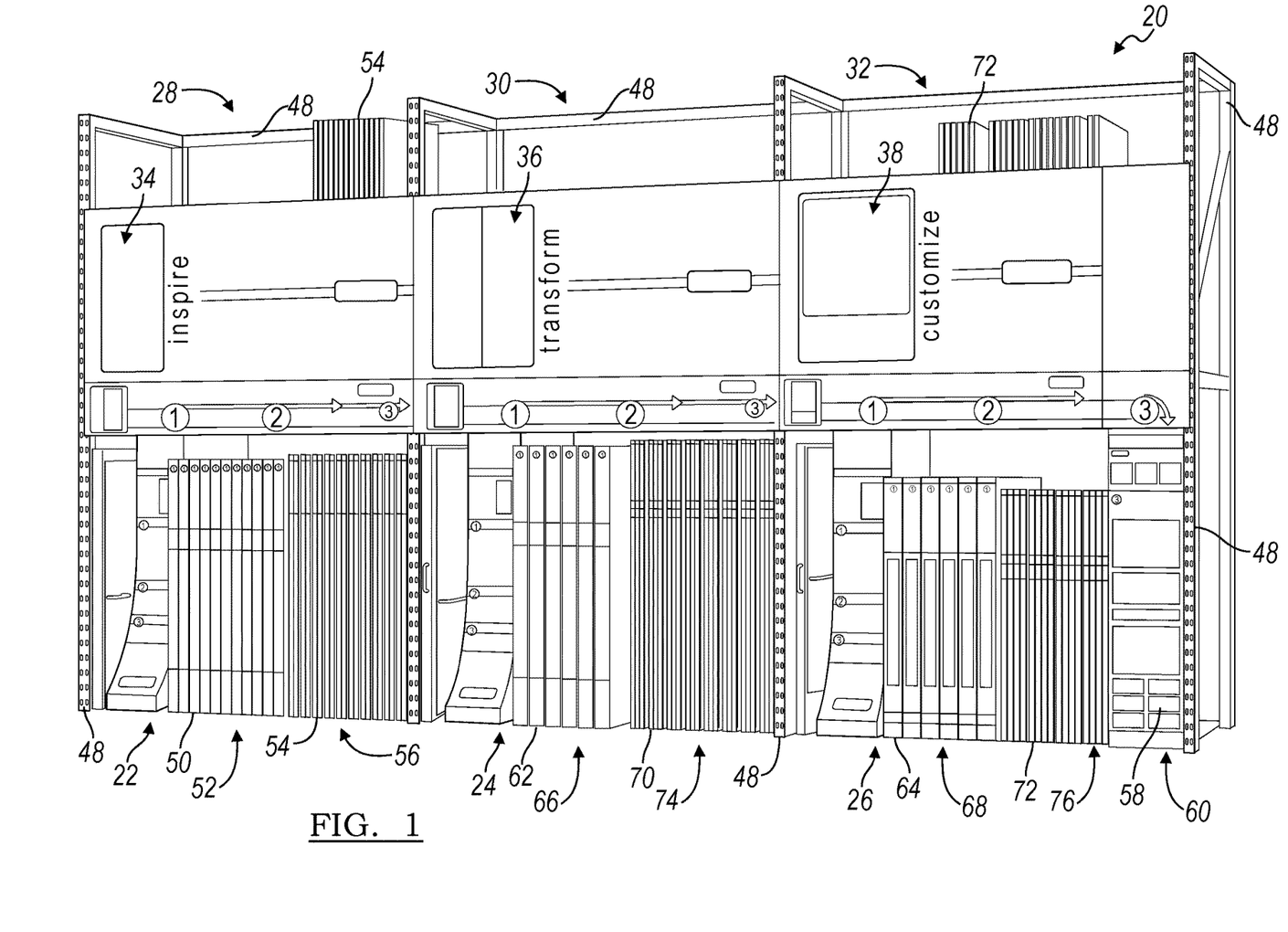
FIG. 1 is a perspective view of a retail system for shower door assemblies according to an embodiment.

Referring now to FIG. 1, a retail shower door display system is illustrated according to an embodiment, and referenced generally by numeral 20. The display system 20 is provided by, for example, an array of six point-of-sale display units 22, which may be referred to as pods or modules. For depicted embodiment, three sequential modules 22, 24, 26 are provided on a ground or floor level; and three sequential modules 28, 30, 32 are provided upon the ground level modules 22, 24, 26. The display system 20 is sized to be displayed within a retail store aisle, such as a home improvement store. The display system 20 is utilized for both displaying and retailing shower door components.

Shower door assemblies are conventionally categorized by function or type. For example, shower door assemblies include pivoting shower door assemblies 34, sliding shower door assemblies 36, and sliding tub door assemblies 38. The display system 20 is separated into each of these three categories 34, 36, 38 with each ground level modules 22, 24, 26 dedicated to one of the categories 34, 36, 38 respectively. Likewise, each of the second row modules 28, 30, 32 is also dedicated to one of the categories 34, 36, 38. Each second row module 28, 30, 32 is aligned with the corresponding module 22, 24, 26 on the ground level. The second row modules 28, 30, 32 can be utilized for displaying an example shower door assembly 34, 36, 38 for the corresponding category. The second row modules 28, 30, 32 are more visible from afar; and are more difficult to reach thereby providing a display function while retaining extra components.

Both rows of modules 22, 24, 26, 28, 30, 32 are utilized for retail of various components for each category 34, 36, 38. The components of each category 34, 36, 38 may function differently and may have different sizes as necessitated for the particular category 34, 36, 38.

The first decision a consumer of shower door assemblies may need to decide is which style or category 34, 36, 38 of shower door assembly is desired. Once the consumer selects a category 34, 36, 38, the consumer may approach the corresponding modules 22, 28 or 24, 30 or 26, 32.

Figure 2:
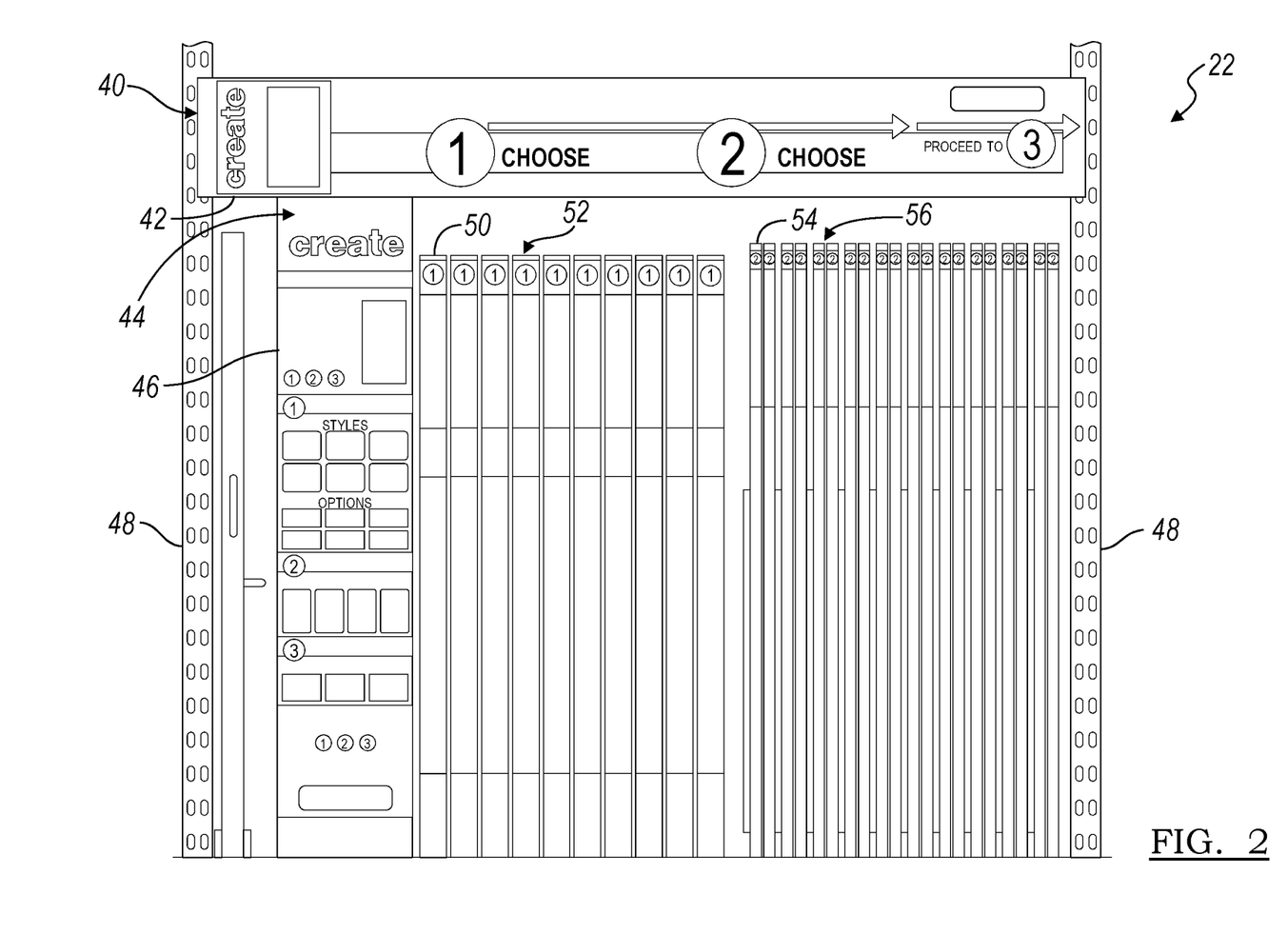
FIG. 2 is an elevation view of a retail shower door display assembly of the retail systems of FIG. 1.

If a consumer is purchasing pivoting shower door assemblies 34, the consumer approaches lower module 22 and upper module 28. Referring now to FIG. 2, the lower module 22 is depicted for pivoting shower door assemblies 34, which could be a stand-alone retail shower door display assembly 22. The module 22 includes indicia 40 generally upon the header 42 for explaining an overall method for selecting components for a pivoting shower door assembly 34. The module 22 may also include instructional indicia 44 upon a side column 46 for explaining a detailed method for selecting components for a pivoting shower door assembly 34.

The module 22 includes a point-of-sale display unit 48 which provides a structure for supporting the lower module 22, as well as the upper module 28. The point-of-display unit 48 is sized to be received within a retail store aisle; and may be sized the same as conventional shelving for preassembled doors for easy replacement.

The module 22 includes various components for the pivoting shower door assembly 34, each packaged separately. According to one embodiment, the module 22 includes an array of various shower door frames 50, which may be oriented within a first region 52 of the display unit 48. The module 22 includes an array of various shower door glass panes 54, which may be oriented within a second region 56 of the display unit 48 adjacent to the first region 52. An array of various shower hardware accessories 58 may be oriented within a third region 60 of the display unit 48 of the third module 26. Said another way, the shower door frames 50, the shower door glass panes 54 and the shower hardware accessories 58 are depicted as oriented sequentially in an order that a consumer would naturally select these components 50, 54, 58. Although the hardware accessories 58 are provided in a separate module 26, the invention contemplates that hardware accessories 58 could be provided in each module 22, 24, 26. Since the hardware accessories 58 are common for each of the shower door assemblies 34, 36, 38, only one region 60 is necessary for the hardware accessories 58 for all three types of shower door assemblies 34, 36, 38.

In selection of a frame 50, the consumer selects whether the shower door itself is to be framed. For example, the perimeter of the door may be framed, or not. The frame 50 is retailed as a kit, which also includes lineals, the frame components that provide the tracks for sliding doors, and/or the pivotal connection for pivoting doors. The frame kit 50 also includes mounting hardware for mounting the frame 50 to the associated shower. The frame 50 is selected from a variety of various styled frames 50 that are offered with and without perimeter frames.

Next, a shower door glass pane 54 is selected from a variety of glass panes 54. The shower door glass panes 54 are each packaged as a kit with associated hardware for mounting the glass pane 54 to the frame 50.

Subsequently, hardware accessories 58, such as towel bars, handles and/or the like are selected from the third region 60. Each hardware accessory 58 is also packaged as a kit with all of the associated hardware for mounting the accessory to the shower door assembly 34.

The module 22 allows the consumer to custom configure a shower door based on the consumer's selection. The module 22 enables the consumer to mix and match style, finish, and glass textures for a customized shower door assembly 34. The module 22 permits the manufacture to retail more Stock Keeping Units (SKUs) in the module 22 than would be practical with traditional preassembled and prepackaged shower door assemblies 34.

By retailing the frames 50, the glass panes 54, and the hardware accessories 58 separately, each component in prepackaged as a kit. The consumer can avoid having to lift, carry and transport a single total weight package due to the separation of the components. Also, the customer can purchase replacement parts without a need to replace an entire shower door assembly.

The manufacturer can also avoid steps of shipping the components to a common facility for assembling and packaging. The manufacturer can also more readily maintain inventory; easily add new products to the module 22; and regionalize the product mix.

Overall, the display system 20 guides the consumer through the purchase process to complete a shower door assembly 34, 36, 38. The packaging of each component can be color-coded or numbered to inform the customer of all of the necessary components required for a shower door assembly 34, 36, 38. The display system 20 also permits consumer customization without having to place a special order directly to the manufacturer.

The module 24 for sliding shower door assemblies 36 and the module 26 for sliding tub door assemblies 38 similarly also each include a point-of-sale display unit 48 with shower door frames 62, 64 each in a first region 66, 68, and shower door glass panes 70, 72 in a second region 74, 76, respectively. The shower hardware accessories 58 are provided in the third region 60 of the third module 26. The upper modules 28, 30, 32 are utilized for displaying an assembled shower door assembly 34, 36, 38 and for storing extra components to assist in stocking the lower modules 22, 24, 26.

Figure 3:
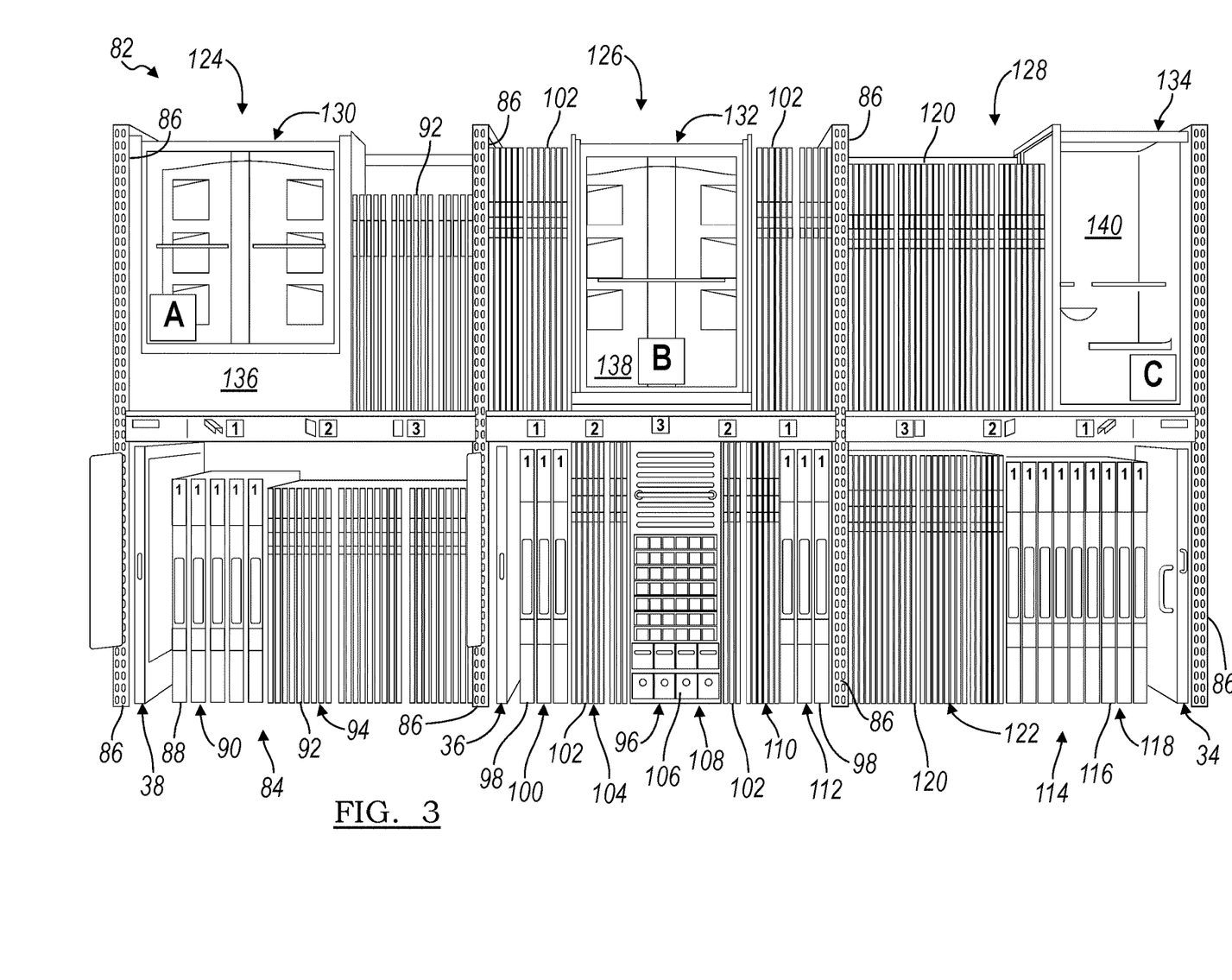
FIG. 3 is a perspective view of a retail system for shower door assemblies according to another embodiment.
Figure 4:
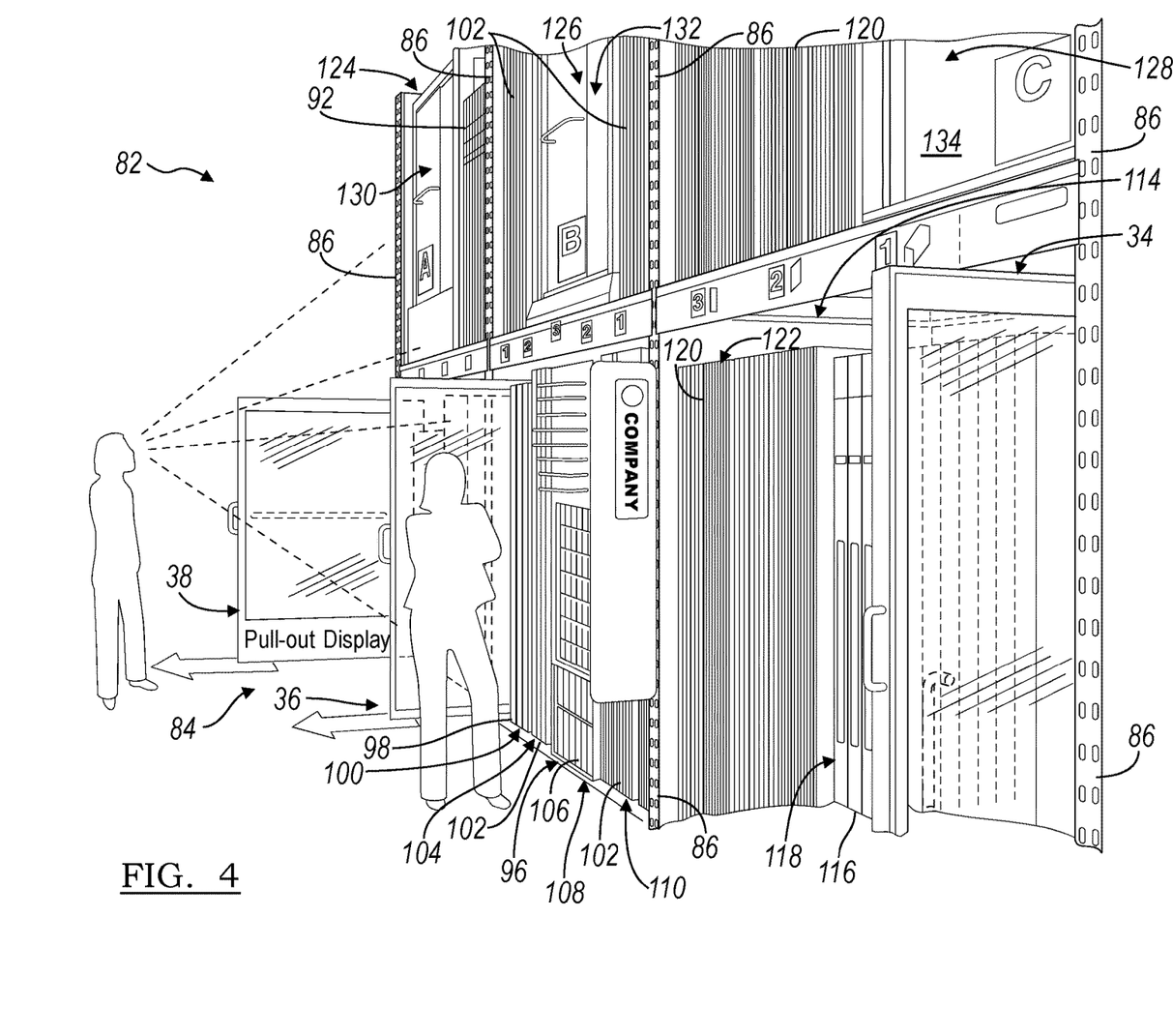
FIG. 4 is another perspective view of the retail system of FIG. 3, illustrating some components in extended positions.

Referring now to FIG. 3, a retail shower display system 82 is illustrated according to another embodiment. The retail shower display system 82 is similar to the prior embodiment. By way of an example, the display system 82 includes a lower module 84 with a point-of-sale display unit 86. The display unit 86 retails shower door frames 88 in a first region 90, and shower door glass panes 92 in a second region 94, for a sliding tub door assembly 38. Referring now to FIG. 4, an assembled sliding tub door assembly 38 is mounted to the point-of-sale display unit 86 for translation relative to the display unit 86 so that the consumer can retract an example sliding tub door assembly 38 from the display unit 86 for point-of-sale review. Likewise, the consumer can retract the sliding tub door assembly 38 into the display unit 86 for concealment in storage when not in use as the display.

With reference again to FIG. 3, another lower module 96 is illustrated with a point-of-sale display unit 86 for retailing components for sliding shower door assemblies 36, also referred to as shower bypass. The display unit 86 includes shower door frames 98 in a first region 100, shower door glass panes 102 in a second region 104, and hardware accessories 106 in a third region 108. In the depicted embodiment, the first module 84 does not include hardware accessories 106. Since the hardware accessories 106 can be common for various shower door assembly types, the hardware accessories 106 for the entire display system 82 may be located centrally for the system 82. For purposes of symmetry, and for consistency in the assembly process, shower door glass panes 102 may be provided in a fourth region 110; and shower door frames 98 may be provided a fifth region 112.

Referring now to FIG. 4, an assembled sliding shower door assembly 36 may be mounted to the display unit 86 of the module 96 for extension and retraction from the display unit 86 for access and review by the consumer.

FIG. 3 also illustrates that the display system 82 includes a third lower module 114 with a point-of-sale display unit 86 for retailing components for a pivoting shower door assemblies 34. The display unit 86 includes shower door frames 116 a first region 118, and shower door glass panes 120 in a second region 122. The second region 122 is inboard on the module 114. In other words, the second region 122 is next to the central module 96 so that process flow begins outboard at the first region 118 and directs the consumer centrally. The third lower module 114 also includes a pivoting shower door assembly 34 mounted to the display unit 86 for translation relative to the display unit 86 so that a consumer can extend and retract the shower door assembly 34.

Another row of modules 124, 126, 128 are each provided on top of the lower modules 84, 96, 114. Thus each of the upper modules 124, 126, 128 is provided with an assembled shower assembly, such as a tub assembly 130, a shower bypass assembly 132, and a shower pivot assembly 134 respectively. Each of the shower assemblies 130, 132, 134 is provided for displaying to the consumer which categories associated with the corresponding modules 84, 96, 114, 124, 126, 128; and to present the visual appearance of the corresponding assembled shower assembly 130, 132, 134. Each shower assembly 130, 132, 134 includes a shower unit 136, 138, 140 with an example of each of the associated components installed to the shower unit 136, 138, 140. Each of the modules 124, 126, to 128 in the upper row may also be utilized for stocking extra components for retail in the lower modules 84, 96, 114.

Figure 5:
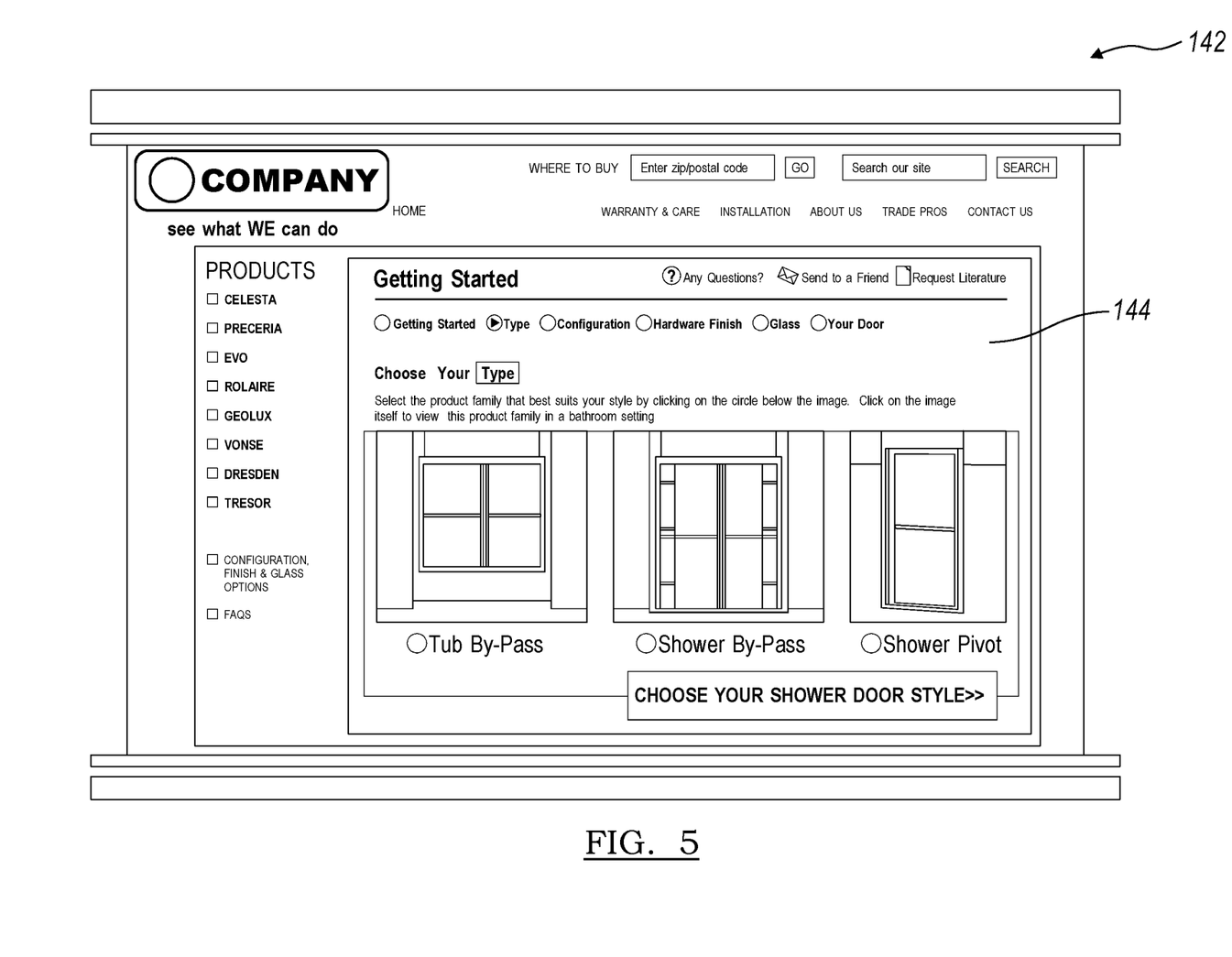
FIG. 5 is a schematic display according to another embodiment.

Referring now to FIG. 5, a retail shower door display system 142 is illustrated according to another embodiment. Conceptually, the display system 142 is similar to prior embodiments. However, the display system 142 is depicted on a display 144 by a controller. The controller generally includes any number of microprocessors, ASICs, ICs, memory (e.g., FLASH, ROM, RAM, EPROM and/or EEPROM) which co-act with software code to perform the operations of the method(s). Accordingly, the manufacturer may provide the display system 142 on a website, or the kiosk, whereby a consumer may make the same selection criteria is in the prior embodiments. The selected components may be made available to the consumer for pickup at a local retailer; or alternatively, the selected components may be shipped directly to the consumer. In FIG. 5, the display system 142 requires the consumer to select a type of the shower assembly, such as a tub bypass, a shower bypass, or a shower pivot.

Figure 6:
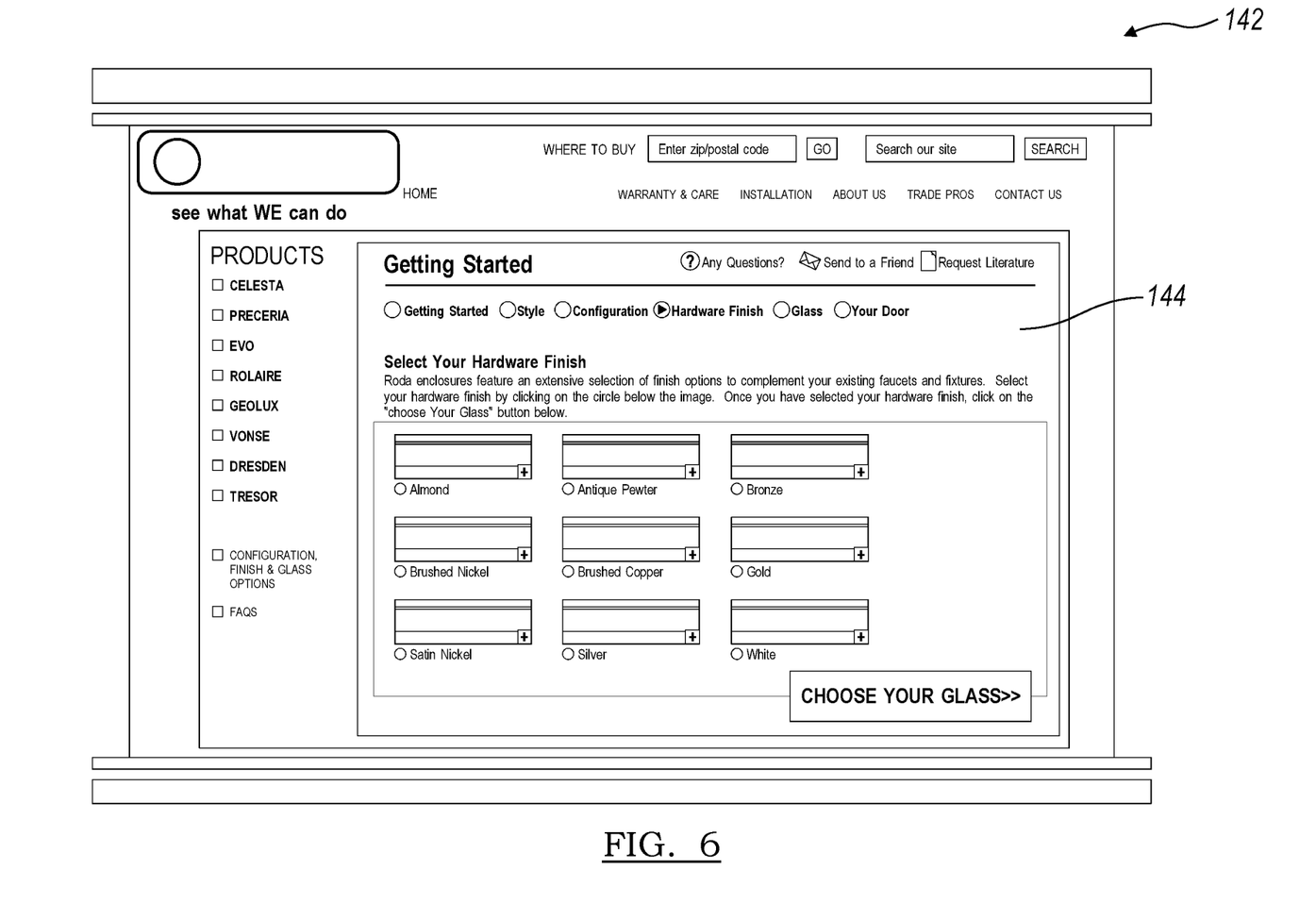
FIG. 6 is a schematic display according to another embodiment.
Figure 7:
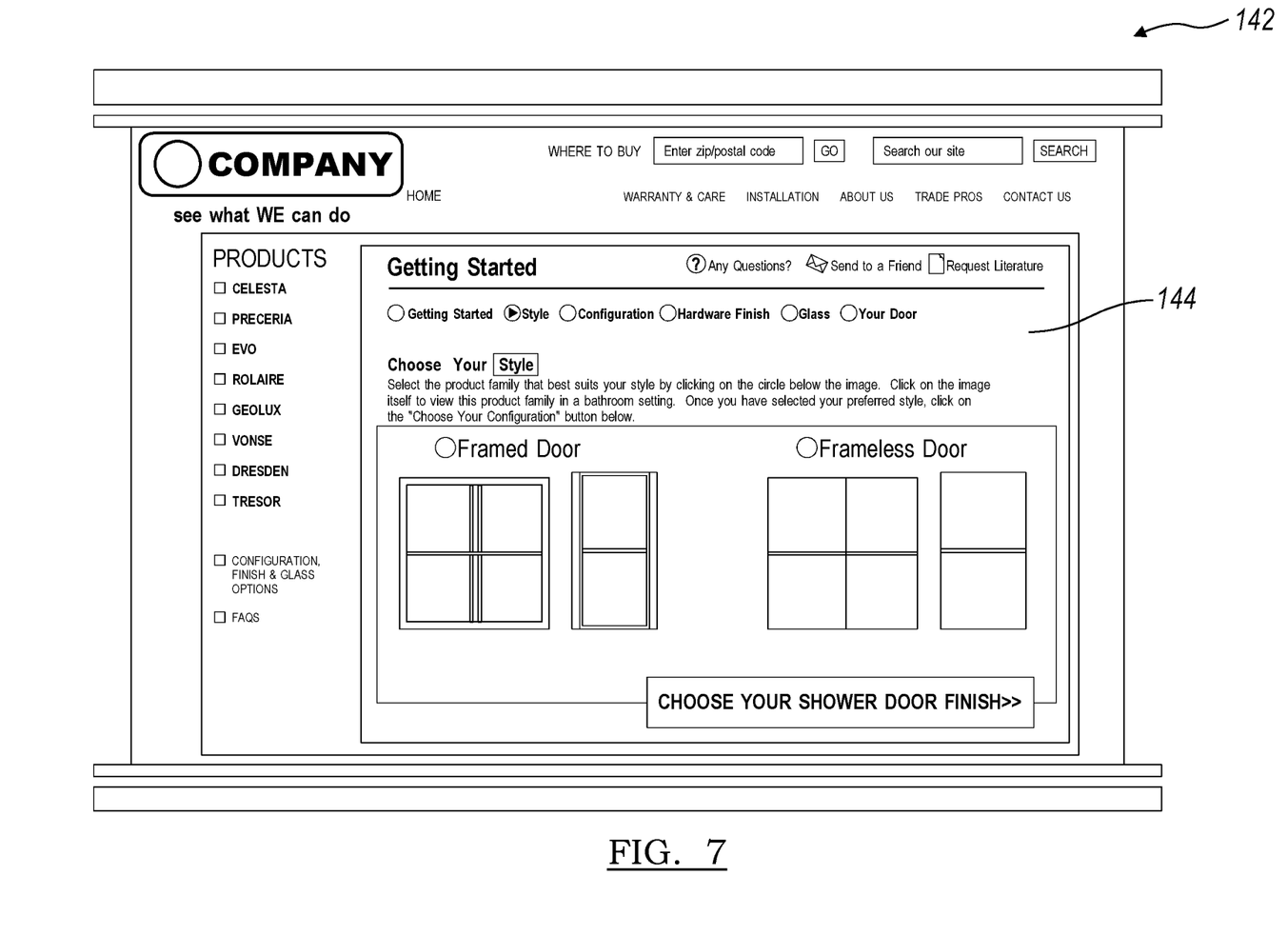
FIG. 7 is a schematic display according to yet another embodiment.

In FIG. 6, the display system 142 displays an array of available shower door frames on the display 144. At the display of FIG. 6, the user selects a desired door frame. In FIG. 7, the user selects the style for the door frame, for example, a framed door, wherein the frame extends around a perimeter of the shower door and about a perimeter of the shower opening; or the consumer selects a frameless door, wherein the frame is provided about a perimeter of the shower opening only. Another display may be provided, which is not shown, whereby the consumer selects the associated hardware accessories also.

The consumer selection of each of the components for the shower door assembly provides input to the manufacturer's database, whereby an example of the consumer's selected shower door assembly is displayed for permitting modifications and/or comparisons in the customizing of the shower door assembly.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method to display shower door assemblies for retail, the method comprising:
   providing a retail display unit with a structure configured to support:
      a first module configured to display one or more shower door frames,
      a second module configured to display one or more glass panes, and,
      a third module configured to display an assembled shower assembly;
   providing an assembled shower door assembly, wherein the assembled shower door assembly is mounted to the retail display unit such that the assembled shower door assembly is translatable relative to the retail display unit;
   displaying various shower door frames packaged separately in the first module of the retail display unit for purchaser selection;
   displaying the assembled shower door assembly;
   displaying various shower door glass panes packaged separately in the second module of the retail display unit for purchaser selection independent of the shower door frames; and
   displaying the assembled shower assembly in the third module of the retail display unit.

2. The method of claim 1 further comprising:
   receiving the separately packaged shower door frames from a first manufacturing facility; and
   receiving the separately packaged shower door glass panes from a second manufacturing facility that is different than the first manufacturing facility.

3. The method of claim 1 further comprising selecting a shower door assembly.

4. The method of claim 1 further comprising displaying various shower hardware accessories in the retail display unit for purchaser selection independent of the shower door frames and the shower door glass panes.

5. The method of claim 4 further comprising displaying the various shower door frames, the various shower door glass panes, and the various shower hardware accessories in a sequence in the retail display unit.

6. The method of claim 5 further comprising displaying instructional indicia for consumer selection of a shower door frame, a shower door glass pane, and a shower door hardware accessory from the retail display unit.

7. The method of claim 1 further comprising displaying the various door frames for different shower door sizes.

8. The method of claim 1 further comprising displaying the various shower door frames for various shower door styles.

9. The method of claim 1 further comprising displaying the various shower door glass panes for various shower door styles.

10. The method of claim 1 further comprising:
   displaying the various shower door frames in a first region of the retail display unit; and
   displaying the various shower door glass panes in a second region of the retail display unit.

11. The method of claim 10 further comprising displaying various shower hardware accessories in a third region of the retail display unit for purchaser selection independent of the shower door frames and the shower door glass panes.

* * * * *